(12) United States Patent
Fang et al.

(10) Patent No.: US 11,332,387 B2
(45) Date of Patent: May 17, 2022

(54) REMOVING ARSENIC FROM WATER WITH ACID-ACTIVATED CLAY

(71) Applicants: Mingming Fang, Naperville, IL (US); Heng Wang, Hoffman Estates, IL (US)

(72) Inventors: Mingming Fang, Naperville, IL (US); Heng Wang, Hoffman Estates, IL (US)

(73) Assignee: Fuel Tech, Inc., Warrenville, IL (US)

( * ) Notice: Subject to any disclaimer, the term of this patent is extended or adjusted under 35 U.S.C. 154(b) by 319 days.

(21) Appl. No.: 16/455,829

(22) Filed: Jun. 28, 2019

(65) Prior Publication Data

US 2020/0002189 A1 Jan. 2, 2020

Related U.S. Application Data

(60) Provisional application No. 62/691,650, filed on Jun. 29, 2018.

(51) Int. Cl.
| | |
|---|---|
| *C02F 1/28* | (2006.01) |
| *C02F 1/72* | (2006.01) |
| *C02F 1/76* | (2006.01) |
| *B01J 20/12* | (2006.01) |
| *B01J 20/30* | (2006.01) |
| *B01J 20/28* | (2006.01) |
| *C02F 1/00* | (2006.01) |
| *C02F 101/10* | (2006.01) |

(52) U.S. Cl.
CPC ............... *C02F 1/281* (2013.01); *B01J 20/12* (2013.01); *B01J 20/28061* (2013.01); *B01J 20/3014* (2013.01); *B01J 20/3085* (2013.01); *C02F 1/722* (2013.01); *C02F 1/76* (2013.01); *C02F 2001/007* (2013.01); *C02F 2101/103* (2013.01)

(58) Field of Classification Search
None
See application file for complete search history.

(56) References Cited

U.S. PATENT DOCUMENTS

| 4,717,699 A * | 1/1988 | Mickelson | B01J 20/12 |
| | | | 502/83 |
| 4,919,818 A * | 4/1990 | Alexander | B01J 20/12 |
| | | | 162/181.8 |
| 5,468,701 A * | 11/1995 | Nebergall | B01J 20/12 |
| | | | 502/22 |
| 5,763,658 A * | 6/1998 | Beihoffer | C07C 51/47 |
| | | | 562/600 |
| 6,315,816 B1 * | 11/2001 | Cho | B01D 53/02 |
| | | | 502/34 |

(Continued)

FOREIGN PATENT DOCUMENTS

| GB | 23902 | * | 1/1901 | |
| WO | WO-2014023849 A1 | * | 2/2014 | ............ C07D 311/72 |
| WO | WO-2017035240 A1 | * | 3/2017 | ............. B01J 20/14 |

*Primary Examiner* — Chester T Barry
(74) *Attorney, Agent, or Firm* — OspreyIP, pllc; James R. Cartiglia

(57) ABSTRACT

The description relates to a composition and a method for reducing the concentration of arsenic in water. Contaminated water is contacted with acid-activated clay characterized by a removal efficiency for arsenic of at least 95 wt %. Following sufficient contact, the water is separated from the acid-activated clay. In preferred form, the acid activated clay is characterized by a BET surface area of at least about 200 $m^2$/gram.

9 Claims, 1 Drawing Sheet

(56) References Cited

U.S. PATENT DOCUMENTS

| | | | | |
|---|---|---|---|---|
| 6,461,535 | B1* | 10/2002 | de Esparza | C02F 1/5236 |
| | | | | 210/667 |
| 2003/0196944 | A1* | 10/2003 | Tanner | C02F 1/003 |
| | | | | 210/201 |
| 2006/0167209 | A1* | 7/2006 | Ostrowski | C08G 65/30 |
| | | | | 528/85 |
| 2012/0024194 | A1* | 2/2012 | Minkara | C04B 18/08 |
| | | | | 106/400 |
| 2015/0137319 | A1* | 5/2015 | Ishibashi | H01L 21/02019 |
| | | | | 257/615 |

* cited by examiner

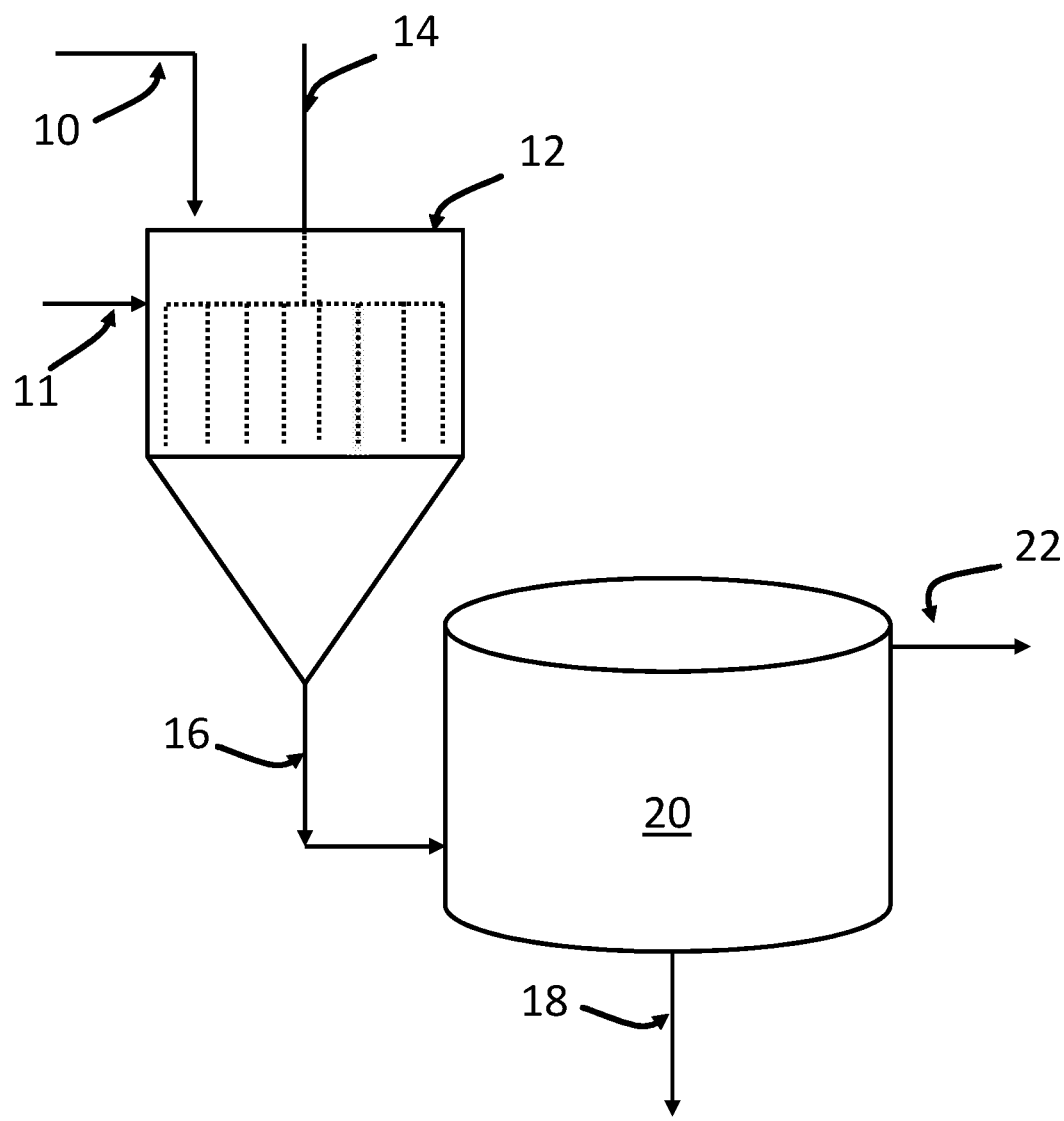

REMOVING ARSENIC FROM WATER WITH ACID-ACTIVATED CLAY

FIELD OF THE INVENTION

The invention relates to the discovery that acid-activated clay, such as acid-activated bentonite, has a high removal efficiency for removal of inorganic arsenic, and other heavy metals, from water, especially when the water is treated with an oxidizer to oxidize the arsenic.

BACKGROUND OF THE INVENTION

A healthy population requires safe drinking water at a reasonable cost. There are many natural and man-made materials that can work their ways into water sources that people depend upon. Unfortunately, wastewater generated from many industries contains a number of heavy metals with much higher concentrations than the safe permissible limits.

Generally, heavy metals are toxic and nonbiodegradable, and their presence in streams and lakes leads to bioaccumulation in living organisms, causing health problems in animals, plants, and human beings. Removal of heavy metal ions from industrial wastewaters is needed before disposal. The various industries that generate such water include tanning, battery, glassware, ceramics, electroplating, mining, paints, and photography industries. These wastewaters contain heavy metals such as chromium (Cr), lead (Pb), cadmium (Cd), arsenic (As), copper (Cu), nickel (Ni), mercury (Hg), zinc (Zn), among others. The amount and number of metals present in any wastewater is related directly to the operations carried out in specific industries. For example, tanneries discharge chromium in wastewater; copper, chromium, zinc, and cadmium are widely generated from metal plating; and lead is generated from a number of industries and mining sources.

Over several decades, a number of methods have been developed to remove heavy metals such as filtration, chemical precipitation, ion exchange, solvent extraction, reverse osmosis, and adsorption. Generally, the order of cost effectiveness for these processes is adsorption>evaporation>aerobic>anaerobic>ion exchange>micro- and ultra filtration>reverse osmosis>precipitation>distillation>solvent extraction. Adsorption appears to be an attractive process due to its simplicity of operation and the availability of wide range of inexpensive adsorbents.

Adsorption is a process in which pollutants are concentrated on a solid surface (adsorbent) from its liquid or gaseous surroundings. A good adsorbent should have a strong affinity for target metal ions (binding them irreversibly under ambient conditions). The most important properties of adsorbents are its removal efficiency (RE), which measures how much, e.g., the percentage, of material (heavy metal ions, in this case) that can be removed by a unit weight of sorbent under fixed conditions.

Activated carbon (AC) has been used widely as an adsorbent for the removal of pollutants from wastewaters. However, the cost of AC is high and therefore, low-cost adsorbents (LCAs) are being investigated by many researchers and companies. The LCAs are basically substitutes for all expensive adsorbents with much better return on investment. These LCAs include both natural materials (such as wood, peat, coal, lignite, clays, etc.) and wastes and byproducts (such as slag, fry ash, red mud, biomass ashes, etc.). Many, like clays, are much less expensive than AC, but have yet to be shown to be competitive for high removal efficiency.

The main benefits of using clays as adsorbents to remove heavy metals from wastewater as used today are their low cost and high abundance and availability combined with the fact that they are available from natural sources with high surface area and high cation-exchange capacities. Moreover, they have chemical and mechanical stability.

Arsenic is one of the most dangerous heavy metals and has been long known as a health hazard. Despite its having been recognized for many adverse effects on human health, it continues to present a problem in some water supplies.

According to the World Health Organization (WHO), arsenic is naturally present at high levels in the groundwater of many localities and is highly toxic in its inorganic form. Water contaminated with arsenic and used for drinking, food preparation and irrigation of food crops poses a serious threat to public health. Long-term exposure to arsenic from drinking-water and food can cause cancer and skin lesions. The WHO has also associated it with cardiovascular disease and diabetes. They also report that In utero and early childhood exposure has been linked to negative impacts on cognitive development and increased deaths in young adults. They advocate provision of a safe water supply as the most important action for affected communities.

Arsenic is a natural component of the earth's crust and is widely distributed, with some areas being more greatly affected than others. The WHO notes that inorganic arsenic is naturally present at high levels in the groundwaters of Argentina, Bangladesh, Chile, China, India, Mexico, and the United States of America, among others. Arsenic also enters the environment as a consequence of its use industrially as an alloying agent, the processing of glass, pigments, textiles, paper, metal adhesives, wood preservatives and ammunition, and hide tanning processes.

As to specific health consequences, it is known that arsenic is a carcinogen and can cause acute arsenic poisoning, typically resulting in vomiting, abdominal pain, diarrhea, numbness and tingling of the extremities, muscle cramping and death. Long-term exposure to high levels of inorganic arsenic can cause skin pigmentation changes, skin lesions hyperkeratosis. Other adverse health effects that may be associated with long-term ingestion of inorganic arsenic include developmental effects, diabetes, pulmonary disease, and cardiovascular disease. This listing is exemplary but shows the need to provide drinking water with safe concentrations.

The current limit of arsenic recommended by the WHO for drinking-water is 10 µg/L, with the understanding that this value is provisional because of practical difficulties in removing arsenic from drinking-water.

The predominant chemical forms of arsenic in water are dissolved As(III) and As(V) compounds. The distribution between As(III) and As(V) is dependent on redox potential of the water. Under oxidation conditions, the predominant species is As(V), which exists as deprotonated oxyanions of arsenic acid ($H_2AsO_4^-$, $HAsO_4^{2-}$, and $AsO_4^{3-}$). Under reducing conditions, As(III) is thermodynamically stable and exists as arsenious ($H_3AsO_3$, $H_2AsO_3^-$, and $HAsO_3^{2-}$).[1]

[1]. Cherry, J. A., Shaikh, A. U., Tallman, D. E., Nicholson, R. V., *J. Hydrol.* 1979, 43, PP. 373-392.

Among the various techniques used for the removal of arsenic from water, adsorption has several advantages including relatively high arsenic removal efficiencies, easy operation and handling, and no sludge production. Many adsorbents have been tested in recent years such as iron-based adsorption that show promising results.[2]

[2]. Mondal, P., Bhowmick, S., Chatterjee, D., Figoli, A., Van der Bruggen, B., *Chemosphere* 2013, 92, PP. 157-170.

However, most adsorbents have relatively low specific surface area and weak interaction with arsenic ions, and relatively high cost. There is a current need for a process for removing inorganic arsenic compositions from water efficiently and at low cost.

Acid-activated clays are commonly used as an adsorbent to remove colored pigments (carotenoids, chlorphyll) and colorless pigments (phospholipids) from edible and in-edible oils.[3] Acid-activated clays are also commonly called "bleaching earth" since they reduce color and produce very clear, almost water white oils that meet with consumers expectations. Bleaching also stabilizes the oil by removing colored and colorless pigments which tend to destabilize the oil.

[3]. Adeyemo, A. A., Adeoye, I. O., Bello, O. S.; "Adsorption of dyes using different types of clay: a review"; Appl Water Sci (2017) vol. 7 PP. 543-568.

The conventional process for producing acid-activated clays typically use calcium bentonite clays (a natural mineral), other clays such as sodium bentonite, attapulgite, and sepiolite are also produced commercially.

The calcium bentonites used in the acid-activated process are hydrated sodium calcium aluminosilicates which typically are mildly basic. During the acid activation process, strong acid such as sulfuric acid is added to the clay at a certain ratio. The acid and the clay are mixed thoroughly (e.g., kneading) at a certain temperature for a certain period of time. The specific process depends on the producer and product requirements, and is known to the art of preparing bleaching earths from naturally-occurring clays.[4]

[4]. See, for example, (1) Rich, A. D., "Bleaching Clay", Industrial Rocks & Minerals, 3$^{rd}$. Ed., AIME, N.Y. PP. 92-101 (1960). (2) Fahn, R., "Bleaching Earths-Preparation, Properties, Practical Applications", Chapter 1 International Symposium, Brussels, Apr. 28-29 (1976). (3) Newman, "Chemistry of Clays and Clay Minerals", PP. 107-114, (1987).

SUMMARY OF THE INVENTION

The present invention provides compositions and processes for reducing the concentration of arsenic in water, as defined in this description and the accompanying claims.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which:

The FIGURE is a is a schematic diagram of one embodiment of the invention.

DETAILED DESCRIPTION OF THE INVENTION

Reference will first be made to the FIGURE, which is a schematic diagram of one embodiment of the invention. The invention can be carried out in a manner illustrated in the FIGURE, wherein an inlet 10 for water to be treated, and an inlet 11 for sorbent replenishment. The inlet 11 can also be used for the introduction of a suitable oxidizing agent, which will be added in an amount sufficient to oxidize substantially all of the arsenic present to the highest valence form. The water to be treated and filled into reaction tank 12, will contain water-soluble arsenic (As) compounds including, but not limited to, arsenite $[AsO_3^{2-}]$ and arsenate $[AsO_4^{2-}]$.

Arsenic in wastewater mainly includes dissolved As(III) and As(V) chemical compounds. The distribution between dissolved As(III) and As(V) is dependent on the redox potential of the wastewater. Under oxidizing conditions, the predominant species is As(V), which exists as arsenate. Depending on the pH of the water, arsenate includes a mixture of deprotonated oxyanions of arsenic acid $(H_2AsO_4^-, HAsO_4^{2-},$ and $AsO_4^{3-})$. Under mildly reducing conditions, As(III) is also stable and exists as arsenite. Depending on the pH of the water, arsenate includes a mixture of arsenious acid $(H_3AsO_3, H_2AsO_3^-, HAsO_3^{2-})$.

The acid-activated bentonite clays used in accord with the invention can remove >95 wt % of arsenate in wastewater but only <25 wt % of arsenite in wastewater. Few solid sorbents can adsorb and remove arsenite effectively in water. Since wastewater usually contains both arsenite and arsenate (the distribution will depend on the original source of arsenic and redox potential), it is most effective to use an oxidant to oxidize arsenite to arsenate, then to adsorb arsenate. See, for example, Table 1 in Int. J. Environ. Res. Public Health 2016, 13, 62; doi:10.3390/ijerph13010062, which is incorporated herein by reference. Among the suitable oxidants are: oxygen, ozone, chlorine, chlorine dioxide, hypochlorite and salts, hydrogen peroxide, potassium permanganate, and biological oxidation. The preferred oxidants are chlorine, hypochlorite and salts, hydrogen peroxide, and potassium permanganate. More preferred oxidants are chlorine and hypochlorite and salts. More preferred oxidant is calcium hypochlorite salt $[Ca(ClO)_2]$ that is a water-soluble salt. When calcium hypochlorite dissolves in water, it generates both hypochlorite and chlorine. Once oxidized, the arsenic is very efficiently removed according to the invention.

The sorbent discovered according to the invention is acid-activated clay, which is commonly used as an adsorbent to remove colored pigments (carotenoids, chlorphyll) and colorless pigments (phospholipids) from edible and in-edible oils.[5] It can be used in a natural clay material, such as calcium bentonite (natural clay material) form or as the purified montmorillonite form, once acid activated by thoroughly wetting with a concentrated (e.g., at least 10% by weight) strong mineral acid, such as hydrochloric, sulfuric or nitric, heating and then drying. The acid-activated clay of the invention has been found effective without the use of iron or other added promoters. The wetting can be accomplished easily in a stirred reactor, with reaction times of from several minutes to six or more hours.

[5]. Adeyemo, A. A., Adeoye, I. O., Bello, O. S.; "Adsorption of dyes using different types of clay: a review"; Appl Water Sci (2017) vol. 7 PP. 543-568.

The acid-activated clay is typically prepared by mixing the clay with an acid or acid solution or by incorporating the acid by kneading at a temperature between room temperature (20° C.) and 60° C. for at least 1 hour. Preferably, the acid activated clay has specific surface area of at least 100 m$^2$/g, preferably has specific surface area at least about 150 m$^2$/gram, and most preferably of least 200 m$^2$/g, as measured by a standard BET specific surface area measurement (Micromeritics Tristar II, N$_2$, 3-point analysis).

According to a preferred form of the process, the oxidizer dosage to the volume of the contaminated water is in the range from about 0.2 to about 5, preferably 0.4 to about 2.5, more preferably from about 0.8 to about 1.5 mg/liter of contaminated water.

The reaction tank 12 is preferably stirred, such as by rotary rake 14 for a residence time in the tank of from about 1 to about 24 hours. The residence time will be selected by a determination of the degree of heavy metal reduction desired and the relative freshness of the acid treated bentonite sorbent. Again, the useful life will be determined by the degree of heavy metal reduction desired as well as the concentration of the heavy metal. Following a sufficient reaction time in reaction tank 12, the mixture of water and sorbent is drained via line 16 to a settling tank 20, from which purified water is extracted via line 22 and sorbent is removed via line 18 for treatment or disposal.

In a broad sense, the compositions of the invention will comprise: a water-soluble oxidizer that can oxidize arsenite to arsenate at the ambient temperature and pressure in water, and an acid-activated bentonite clay. Some clays are mixed, and all are impure as mined, so the invention extends to all of those equivalent acid-activated clays including those selected from the group consisting of bentonite clay, montmorillonite, hectorite, talc, vermiculite, saponite, nontronite, kaolinite, halloysite, illite, and chlorite and mixtures thereof.

Also, in a broad sense, the process will comprise: contacting a contaminated water with a water-soluble oxidizer that can oxidize arsenite to arsenate at the ambient temperature and pressure and an acid-activated clay as defined above. For treating a volume of contaminated water, the acid-activated clay dosage to the volume of the contaminated water is typically in the range from about 1 to about 25, preferably 2 to about 15, more preferably from about 4 to about 10 g/liter of contaminated water.

The following examples are presented to further explain and illustrate the invention and are not to be taken as limiting in any regard. Unless otherwise indicated, all parts and percentages are by weight.

Example 1

This example compares three acid-activated bentonites, three sodium bentonites, a calcium bentonite, a hectorite, a kaolinite, an activated carbon, a zeolite, and a diatomaceous earth for the removal of arsenic (As) from water. All of these solid adsorbents are in fine powder forms with mean particle sizes less than 50 μm.

An As(V) stock solution (1,000 mg/L) was prepared by dissolving 0.425 g of sodium arsenate ($Na_2HAsO_4 \cdot 7H_2O$, Sigma-Aldrich, 98.0%) in distilled water in a 100 mL volumetric flask. The actual As(V) solution used for the adsorption tests was 1 mg/L (it was actually 0.97 mg/L based on MWL's result, see below) that was made by adding 1 ml of the 1,000 mg/L stock As(V) solution into a 1 L volumetric flask and add distilled water to the mark.

The arsenic removal wt % was calculated by $[(C_0-C_f)/C_0] \times 100\%$, where $C_0$ is the original concentration of arsenic, $C_f$ is the final concentration of arsenic.

For each adsorption run, 50 mL of the pre-made 1 mg/L As(V) solution was added into a 125 mL Erlenmeyer flask. A measured amount (0.5 g) of solid adsorbent was added into the solution above. The adsorbent and the As solution were agitated on an orbital shaker (Benchmark Orbi-Shaker, Sigma-Aldrich) at 200 rpm for 30 min. The liquids after the agitation were centrifuged at 5,000 rpm for 30 min (Sorvall Legend X1 Centrifuge, Thermo Scientific). After the centrifuge, small amounts of the clear top liquid were sent to an analytical lab for total As analysis.

All the As levels were analyzed by Midwest Laboratories, Inc. (MWL, Omaha, Nebr.) based on EPA 200.8 method via Inductively Coupled Plasma Mass Spectroscopy (ICP-MS). The limit of detection for ICP-MS was 0.1 μg/L.

Table 1 shows the results for arsenic removal wt % of these solid adsorbents tested under the same experimental conditions. The results indicate that the acid-activated bentonite adsorbents have very high arsenic removal (>95 wt %) compared to the other adsorbents except for the much more expensive activated carbon sample. These results have been repeated and confirmed.

TABLE 1

| Absorbent | Residual Arsenic Content (μg/g) | Removed Arsenic wt % |
|---|---|---|
| Baseline - No Adsorbent | 1.060 | N/A |
| Acid-activated Bentonite A | 0.011 | 99.01 |
| Acid-activated Bentonite B | 0.012 | 98.91 |
| Acid-activated Bentonite C | 0.046 | 95.64 |
| Sodium Bentonite A | 1.015 | -4.68 |
| Sodium Bentonite B | 0.790 | 25.47 |
| Sodium Bentonite C | 1.040 | 1.89 |
| Calcium Bentonite | 0.839 | 20.89 |
| Hectorite | 0.997 | 5.98 |
| Kaolinite | 0.154 | 85.49 |
| Mix of Bentonite/Attapulgite | 0.485 | 54.28 |
| Zeolite | 1.099 | -3.69 |
| Activated Carbon | 0.006 | 99.47 |
| Diatomateous Earth | 1.085 | -2.31 |

Example 2

This example shows the relationship between the arsenic removal wt % and specific surface area of different acid-activated bentonite adsorbents. The surface areas of the adsorbents were measured using a standard BET specific surface area measurement (Micromeritics Tristar II, $N_2$, 3-point analysis) and are presented in Table 2 below.

Table 2 results indicate that a higher the specific surface area of the acid-activated bentonite results in better arsenic removal efficiencies. Specifically, acid-activated bentonites with surface areas above 200 $m^2/g$ have arsenic removal efficiencies above 95 wt %. Other surface properties such as pore volume and mean pore size were also measured but the results show no clear correlations to their arsenic removal results.

TABLE 2

| Absorbent | Removed Arsenic wt % | Specific Surface Area ($m^2/g$) |
|---|---|---|
| Acid-activated Bentonite A | 99.01 | 294.3 |
| Acid-activated Bentonite B | 98.91 | 225.4 |
| Acid-activated Bentonite C | 95.64 | 289.6 |
| Acid-activated Bentonite W | 36.85 | 139.2 |
| Acid-activated Bentonite X | 27.85 | 149.6 |
| Acid-activated Bentonite Y | 20.98 | 67.8 |
| Acid-activated Bentonite Z | 19.02 | 91.0 |

Example 3

This example shows the dosage effect of the acid-activated bentonite adsorbents for arsenic removal from water.

For each adsorption run, 50 mL of the pre-made 1.06 mg/L As(V) solution was added into a 125 mL Erlenmeyer flask. The amount of solid adsorbent added into the solution above was modified based on the tests. The adsorbent and the As solution were agitated on an orbital shaker (Benchmark Orbi-Shaker, Sigma-Aldrich) at 200 rpm for 30 min. The liquids after the agitation were centrifuged at 5,000 rpm for 30 min (Sorvall Legend X1 Centrifuge, Thermo Scientific). After the centrifuge, small amounts of the clear top liquid were sent to an analytical lab for total As analysis.

All the As levels were analyzed by Midwest Laboratories, Inc. (MWL, Omaha, Nebr.) based on EPA 200.8 method via Inductively Coupled Plasma Mass Spectroscopy (ICP-MS). The limit of detection for ICP-MS was 0.1 µg/L.

Table 3A, Table 3B, and Table 3C data show that when the dosages of acid-activated bentonite adsorbents are above certain critical numbers, their As adsorption efficiencies are very high (>95%). When the dosage level is lower than that number, the As adsorption efficiency starts to decrease. For different acid-activated bentonite adsorbents, their critical dosage levels are not necessarily the same, which might be because each adsorbent has its unique surface properties such as surface acidity and surface area.

TABLE 3A

| Acid-activated Bentonite A/ Water Volume (g/L) | Residual Arsenic Content (µg/g) | Removed Arsenic wt % |
|---|---|---|
| Baseline - No Adsorbent | 1.060 | N/A |
| 10 | 0.011 | 99.01 |
| 5 | 0.0332 | 97.04 |
| 2 | 0.1349 | 87.95 |

TABLE 3B

| Acid-activated Bentonite B/ Water Volume (g/L) | Residual Arsenic Content (µg/g) | Removed Arsenic wt % |
|---|---|---|
| Baseline - No Adsorbent | 1.060 | N/A |
| 10 | 0.012 | 98.91 |
| 5 | 0.0200 | 98.21 |
| 2 | 0.1591 | 85.79 |

TABLE 3C

| Acid-activated Bentonite C/ Water Volume (g/L) | Residual Arsenic Content (µg/g) | Removed Arsenic wt % |
|---|---|---|
| Baseline - No Adsorbent | 1.060 | N/A |
| 10 | 0.046 | 95.64 |
| 5 | 0.1877 | 83.24 |
| 2 | 0.4709 | 57.95 |

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A method for removing arsenic from contaminated water which comprises contacting the contaminated water with:
   a. an acid-activated clay selected from the group consisting of bentonite, montmorillonite, hectorite, talc, vermiculite, saponite, nontronite, kaolinite, halloysite, illite, and chlorite and mixtures thereof, wherein the acid-activated clay dosage to the volume of the contaminated water is in the range from about 1 to about 25 g/liter of contaminated water; and
   b. a water-soluble oxidizer that can oxidize arsenite to arsenate, wherein the oxidizer dosage to the volume of the contaminated water is in the range from about 0.2 to about 5 mg/liter of contaminated water.

2. The method of claim 1, wherein the acid-activated clay is bentonite.

3. The method of claim 1, wherein the acid-activated clay is generated by spraying the clay with an acid or acid solution or by incorporating the acid by kneading, at a temperature between 20° C. and 60° C. for at least 1 hour.

4. The method of claim 1, wherein the acid activated clay has specific surface area of at least 100 m$^2$/g, preferably has specific surface area of least 200 m$^2$/g.

5. The method of claim 1, wherein the oxidizer comprises chlorine.

6. The method of claim 1, wherein the oxidizer is calcium hypochlorite.

7. The method of claim 1 used for the batch wise arsenic removal from a volume of contaminated water.

8. A method according to claim 1, wherein the acid-activated clay dosage to the volume of the contaminated water is in the range from about 2 to about 15 g/liter of contaminated water.

9. A method according to claim 1, wherein the oxidizer dosage to the volume of the contaminated water is in the range from about 0.4 to about 2.5 mg/liter of contaminated water.

* * * * *